United States Patent [19]

Cremona

[11] 4,063,578

[45] Dec. 20, 1977

[54] SAFETY DEVICE FOR USE WITH A WOOD SHEARING MACHINE

[76] Inventor: Angelo Cremona, V. le Lombardia, 275, Monza, Italy, 20052

[21] Appl. No.: 686,840

[22] Filed: May 17, 1976

[30] Foreign Application Priority Data

July 14, 1975 Italy .................................. 25371/75

[51] Int. Cl.² .............................................. B27F 5/00
[52] U.S. Cl. ......................................... 144/178; 83/62
[58] Field of Search ........................... 83/62, 556, 558; 144/178, 179, 321, 343; 408/14

[56] References Cited

U.S. PATENT DOCUMENTS

| 1,615,489 | 1/1927 | Straub | 144/178 |
|---|---|---|---|
| 2,714,410 | 8/1955 | Midler | 83/62 |
| 3,680,612 | 9/1972 | Hale | 144/178 |

Primary Examiner—Harrison L. Hinson
Assistant Examiner—W. D. Bray
Attorney, Agent, or Firm—McGlew and Tuttle

[57] ABSTRACT

The safety device is applied to a vertical type, wood shearing or veneer cutting machine, and prevents the blade-holding unit and the bar-carrying unit from striking the hooks of the wood supporting table, during the shearing process. The safety device comprises a set of magnetic proximity switches, placed on the bar-carrying unit near and above the cutting point, equally spaced from each other and opposed to respective hooks or dogs fixed to the wood supporting table. The hooks are also equally spaced and are alternatively of greater and smaller length, so that the upward and downward vertical motion of the wood stock is stopped when the magnetic switches near the hooks of greater length and operation of the machine is stopped so that the hooks or dogs can be replaced by others of smaller length.

3 Claims, 3 Drawing Figures

SAFETY DEVICE FOR USE WITH A WOOD SHEARING MACHINE

BACKGROUND OF THE INVENTION

As known in the art, in vertical type wood shearing machines, the wood stock, which keeps decreasing in thickness, requires in order to fix it to the table supporting it, hooks or dogs of constantly smaller length, so as to maintain the hooks free from a portion of the wood stock to be reduced to sheets.

It is therefore necessary for the operator to stop the blade-holding and bar-carrying units during their feeding stroke, every time the fixing hooks have to be replaced by others of smaller length, since if this is not done the blade would strike the hooks and become damaged.

In order to avoid such a drawback, it has been proposed to automatically stop the blade-holding and bar-carrying units in two or more predetermined positions, by providing the wood shearing machine with two or more limit stops located on the guides of the units and adapted to function when actuated by corresponding microswitches. The latter become sensitive when coming into contact with a respective box, originally containing a set of hooks, when it is empty and the hooks are mounted on the machine.

It may be readily understood that the assembly, comprising the microswitches/limit stops and boxes to collect the hooks not being used, is a mechanically and electrically complex assembly which therefore does not ensure sufficient safety.

SUMMARY OF THE INVENTION

The present invention proposes eliminate said this drawback by resorting to the use of several magnetic proximity switches which, as known, function when they approach near a ferrous body.

It has therefore been found advantageous to fix, at the front of the blade-holding and bar-carrying unit, in proximity to the cutting point, a certain number of these magnetic switches equal to the number of hooks used to fix the wood stock, and similarly equally spaced.

Each switch is aligned on the path of an opposed hook so as to stop the machine when the hooks faces it or comes too near.

The accompanying drawings, given by way of example only and without limitation, show a preferred embodiment of the safety device according to the invention.

DETAILED DESCRIPTION OF THE PREFERRED EMBODIMENT

Figure 1:
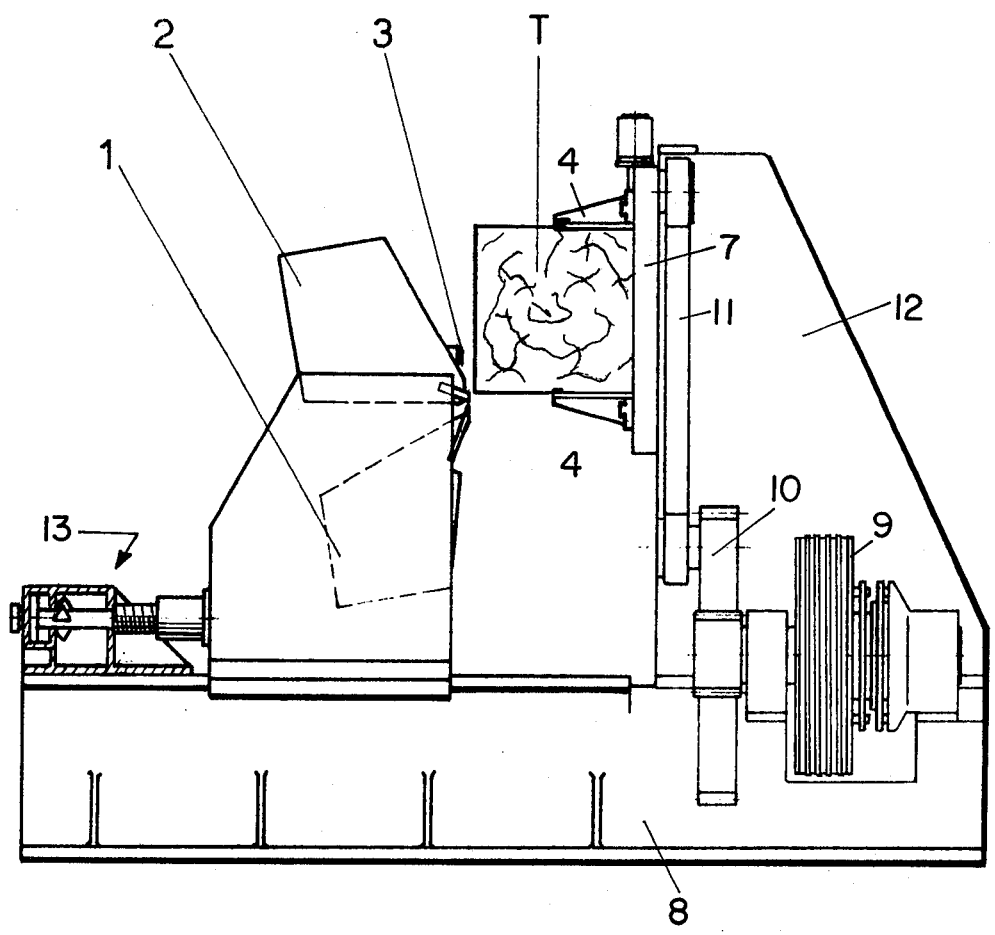
FIG. 1 shows a side view of the wood shearing machine provided with the device according to the invention.
Figure 2:
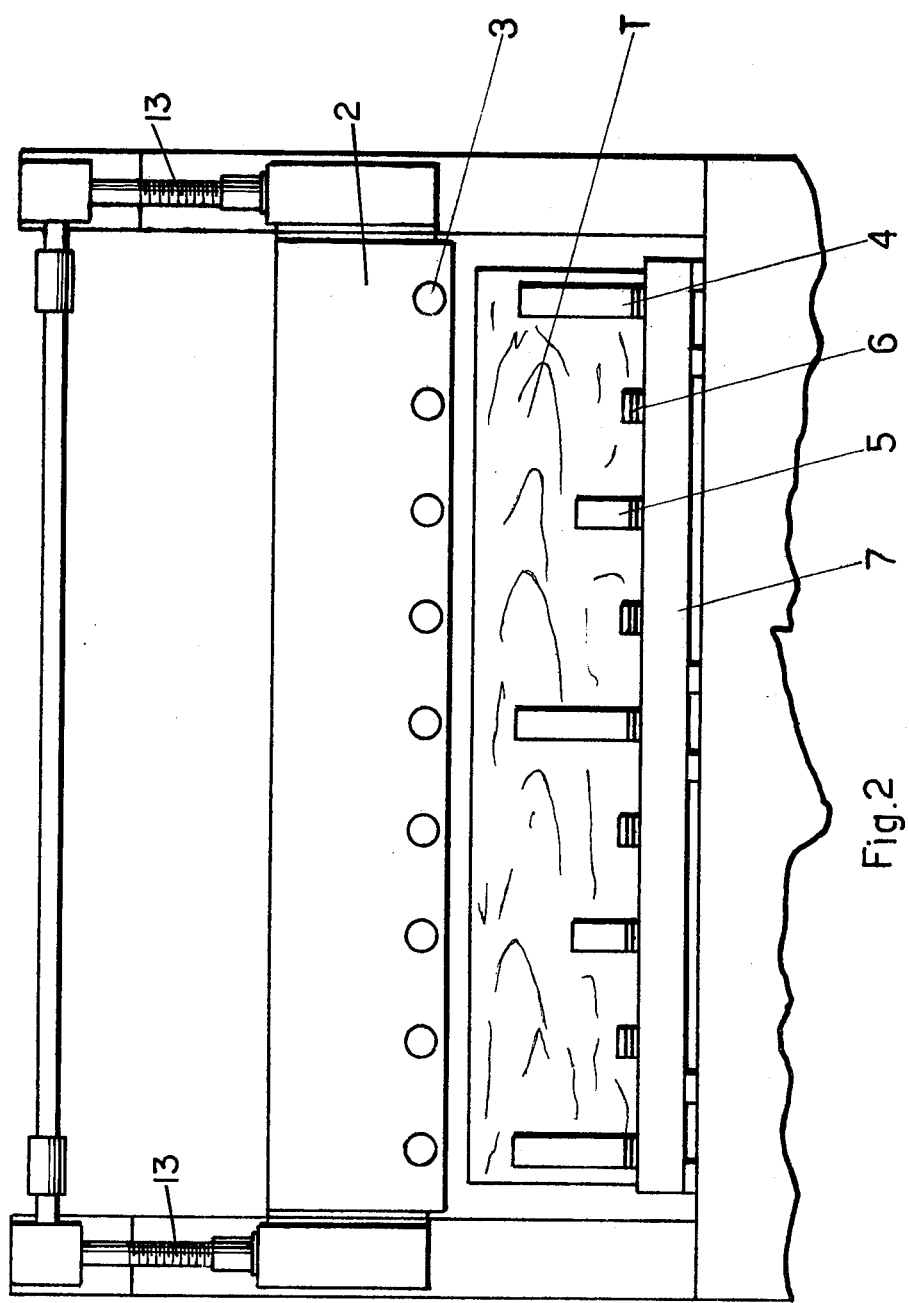
FIGS. 2 and 3 show top views of the wood shearing machine before the wood stock has been cut and after it has been cut up to the point where the longer hooks are provided, respectively.
Figure 3:
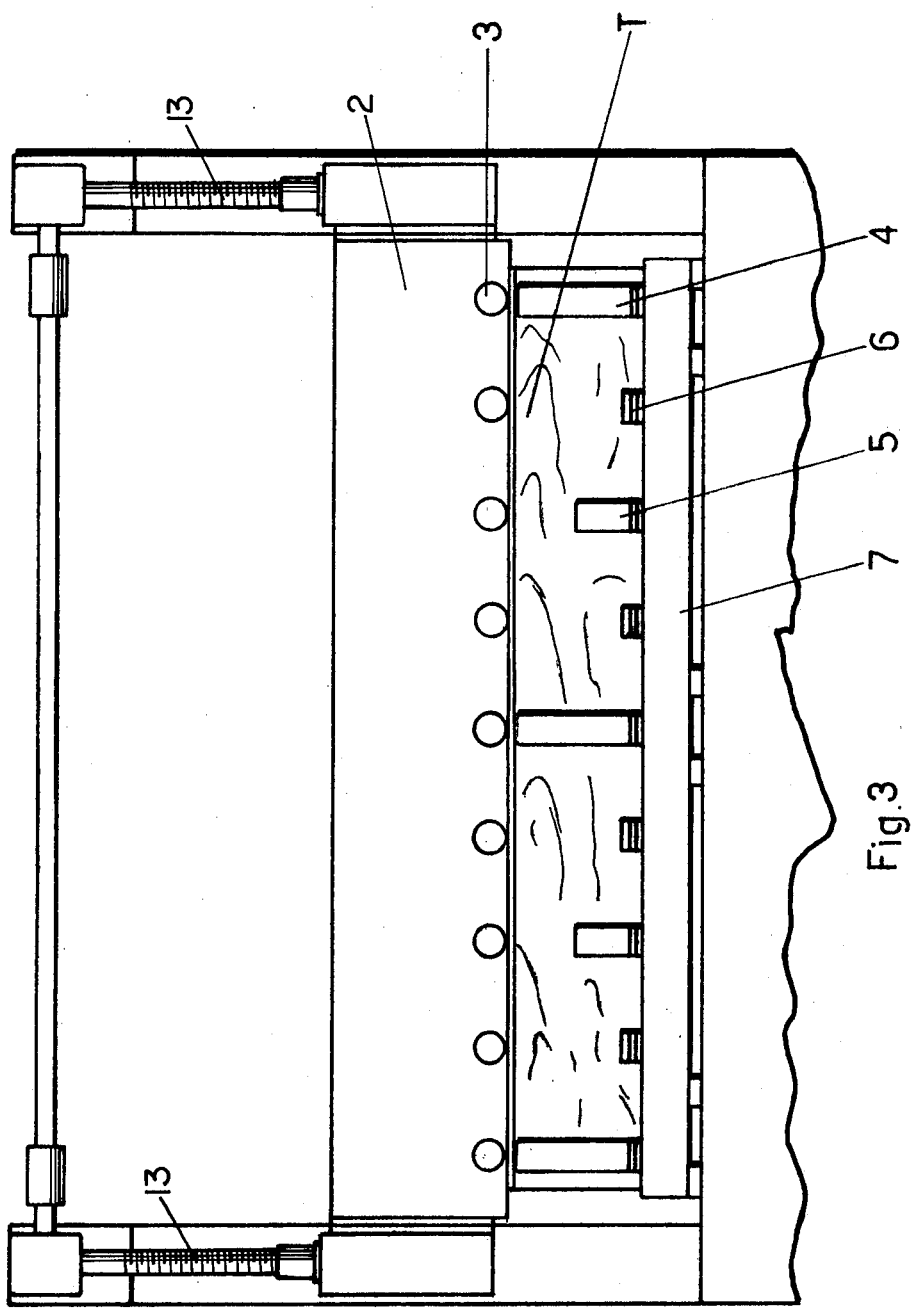

As may be seen from the drawing, the blade-carrying unit 1, conventionally placed above the bar-holding unit 2, has applied thereto a set of magnetic switches 3 located near the cutting point and equally spaced from each other. Opposed thereto, and also equally spaced, there are long hooks 4 and hooks of medium length 5 alternatively placed on the wood supporting table 7.

The machine comprises a substantially horizontal base on which the wood supporting table and the units 1 and 2 are mounted. Supporting table 7 is mounted for vertical reciprocation in a guide 12 fixedly mounted on base 8. Wood support table 7 is reciprocated by a pulley 9 driving a crank wheel 10 connected by a connecting rod 11 to support table 7. Base 8 also supports the units 1 and 2 which are mounted thereon for conjoint displacement therealong toward support table 7. Such displacement may be effected by a mechanism generally indicated at 13 and which may be either automatically or manually operated to step the units 1 and 2 along base 8 toward support table 7.

When the magnetic switches 3 reach a predetermined distance from the opposed long hooks 4, the reciprocating motion in a vertical direction of the wood stock T stops, thus interrupting the operative cycle.

The long hooks 4 are then removed and replaced by short hooks 6, and the cycle may continue until the switches 3 reach hooks 5.

The final step, similar to the previous ones, takes place when the hooks of medium length 5 ae removed, and continues until the switches reach the short hooks 6.

As a variation, if desired, the magnetic switches may be provided instead, or in addition, on the bar-holding unit. It should be obvious that, when a larger set of hooks is provided in the machine, all of them can be used successively, and when the blade-holding unit is provided in the machine above the bar-carrying unit, it is indifferent, which of them — whether the upper one or the lower one — has fixed thereto the magnetic switches.

From the foregoing it will be clear that operation of the machine is safe and rational since the operator has to intervene only when the machine is stopped to replace the hooks without having to perform any other adjustment.

While a specific embodiment of the invention has been shown and described in detail to illustrate the application of the principles of the invention, it will be understood that the invention may be embodied otherwise without departing from such principles.

I claim:

1. In a vertical type wood shearing machine including a substantially horizontal base, a guide mounted on the base at a fixed position thereon, a wood support table reciprocable vertically in the guide, drive means operable to reciprocate the support table, means on the support table operable to grip and hold a wood stock thereon, a blade holding unit and a bar carrying unit mounted on the base for conjoint displacement therealong toward the support table, and means for so conjointly displacing the two units, an improved safety device comprising a plurality of magnetic proximity switches mounted on one of said blade holding and bar-carrying units at equal spacings along a row extending transversely of said shearing machine; said gripping means comprising a plurality of ferrous metal hooks on said support table arranged at equal spacings in a row extending transversely of said shearing machine, each hook being aligned with a respective magnetic proximity switch; each magnetic proximity switch, when actuated due to proximity to its associated hook, interrupting operation of said shearing machine.

2. In a vertical type wood shearing machine, an improved safety device, as claimed in claim 1, wherein said magnetic proximity switches are mounted on said blade holding unit.

3. In a vertical type wood shearing machine, an improved safety device, as claimed in claim 1, in which said ferrous metal hooks include relatively long hooks alternating with hooks of intermediate length, and relatively short hooks positioned between each relatively long hook and the adjacent hook of intermediate length.

* * * * *